(No Model.) 2 Sheets—Sheet 1.
R. A. MESSERVEY.
REFRIGERATOR COOLED BY AMMONIA AND OTHER VOLATILE LIQUIDS.
No. 256,023. Patented Apr. 4, 1882.
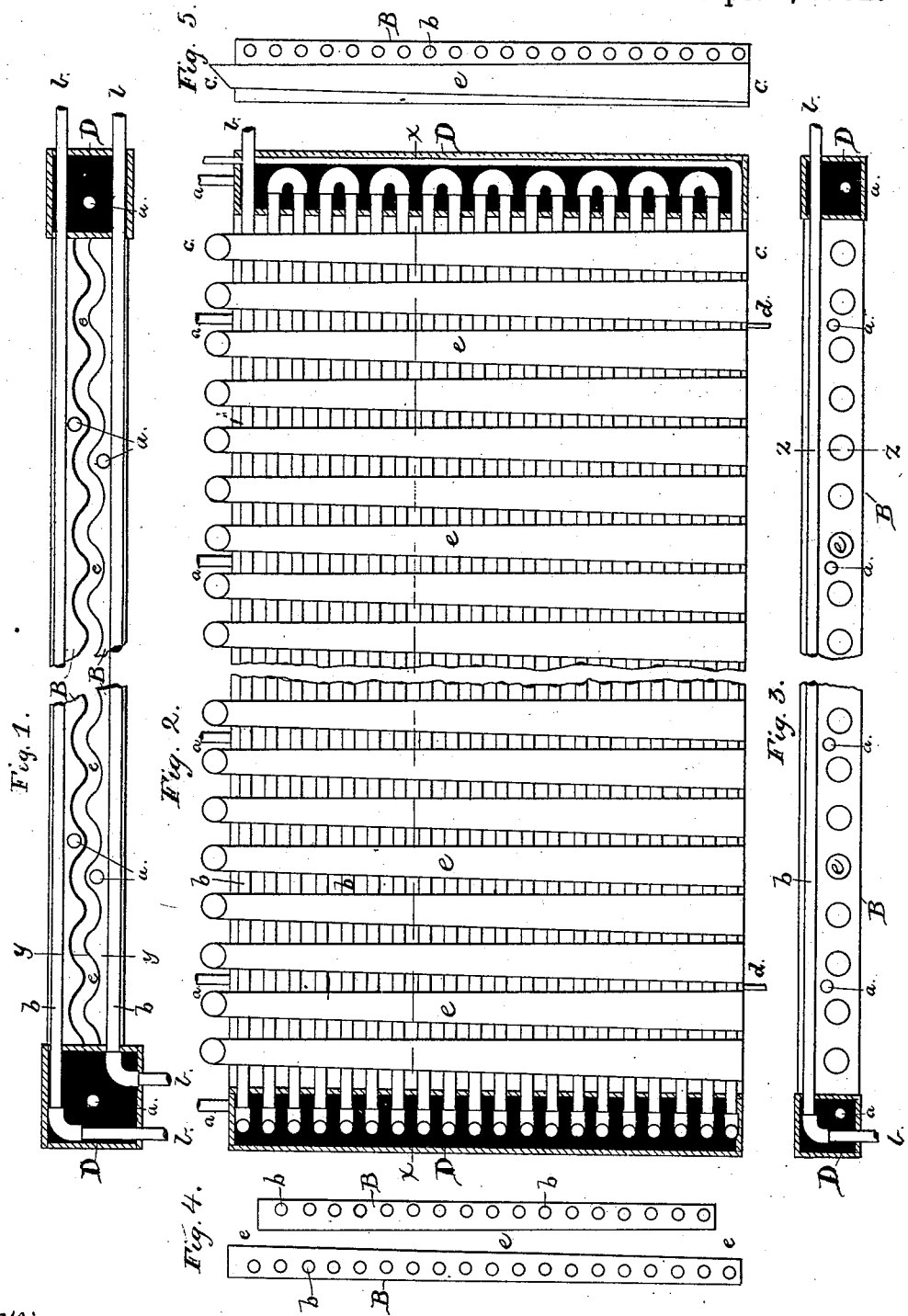

(No Model.) 2 Sheets—Sheet 2.
R. A. MESSERVEY.
REFRIGERATOR COOLED BY AMMONIA AND OTHER VOLATILE LIQUIDS.
No. 256,023. Patented Apr. 4, 1882.
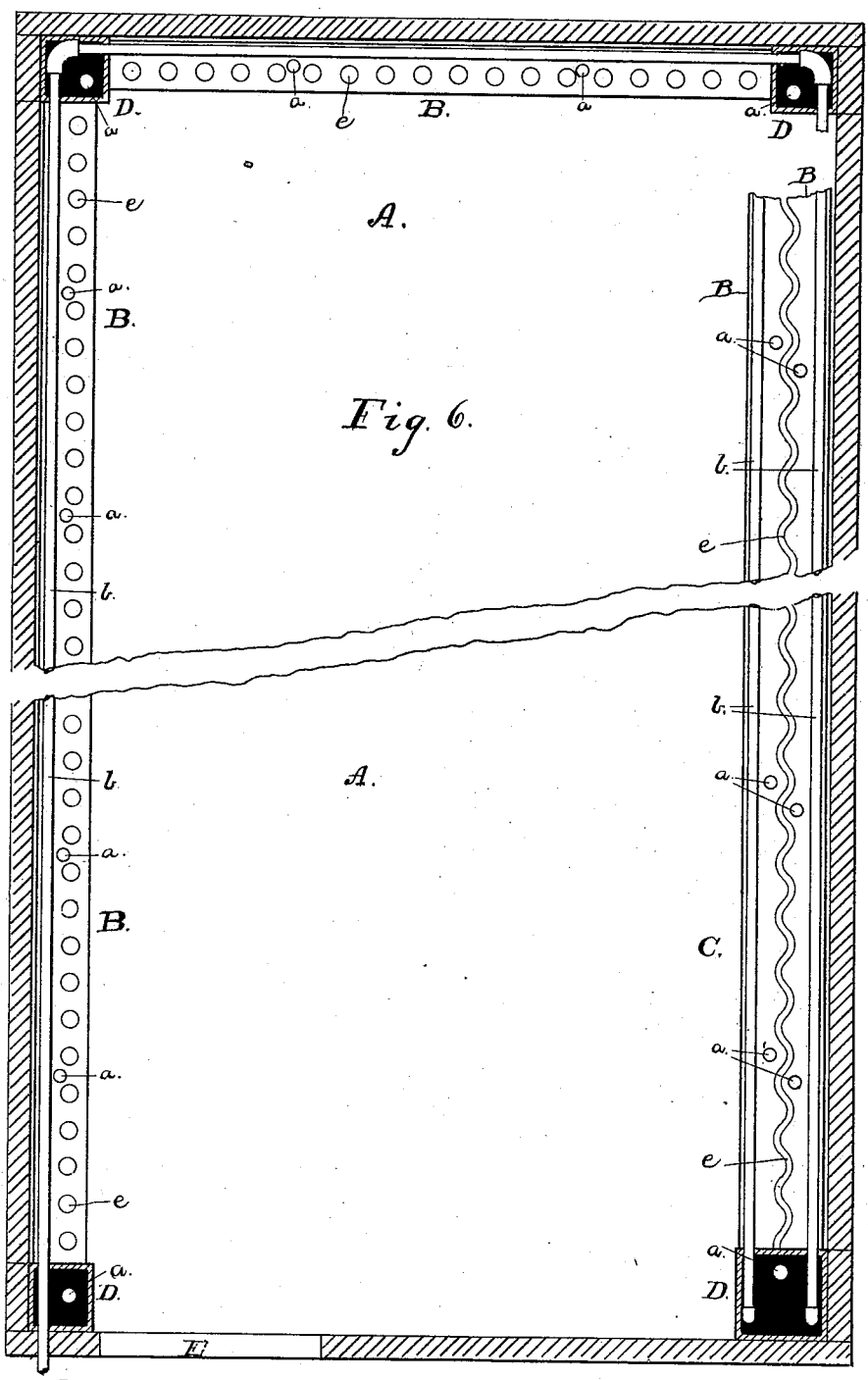

UNITED STATES PATENT OFFICE.

REUBEN A. MESSERVEY, OF MEDFORD, ASSIGNOR OF ONE-HALF TO JOHN M. WATSON, OF BROOKLINE, AND SAMUEL W. JOHNSON, OF MEDFORD, MASSACHUSETTS.

REFRIGERATOR COOLED BY AMMONIA AND OTHER VOLATILE LIQUIDS.

SPECIFICATION forming part of Letters Patent No. 256,023, dated April 4, 1882.

Application filed January 31, 1882. (No model.)

*To all whom it may concern:*

Be it known that I, REUBEN A. MESSERVEY, of Medford, in the county of Middlesex and State of Massachusetts, have invented certain Improvements in Refrigerators Cooled by Ammonia and other Volatile Liquids, of which the following is a specification.

This invention relates to refrigerators in which a chemical refrigerant—such as ammoniacal gas, anhydrous sulphurous oxide, &c.—is circulated in pipes around a chamber or receptacle for articles to be preserved.

The invention consists in certain improvements in construction, whereby, first, the refrigerant is prevented from escaping into the preserving-chamber in case of a leak in the refrigerating-pipes; secondly, access can be had to said pipes for repairs without allowing outside air or gas from the pipes to enter the preserving-chamber; thirdly, direct contact between the surfaces of the refrigerating-pipes and the air in the preserving-chamber is prevented and said pipes are kept to a great extent free from frost; and, fourthly, air-passages of improved form and greater cooling capacity are provided than those heretofore used, all of which I will now proceed to describe and claim.

Of the accompanying drawings, forming a part of this specification, Figure 1 represents a horizontal section of one wall of a refrigerating-chamber embodying my invention. Fig. 2 represents a vertical section of a wall having differently-constructed air-passages. Fig. 3 represents a section on line $x\ x$, Fig. 2. Figs. 4 and 5 represent respectively sections on lines $y\ y$ and $z\ z$, Figs. 1 and 3. Fig. 6 represents a horizontal section, showing the entire preserving-chamber and both forms of air-passages.

The same letters of reference indicate the same parts in all the figures.

In carrying out my invention I provide a preserving-chamber, A, of any suitable size and form. Along the walls of said chamber I arrange the refrigerating-pipes $b$, which are carried back and forth to form a continuous conduit extending from the lower to the upper portion of the chamber, and on any desired number of sides thereof, preferably three, as shown in Fig. 6. The arrangement of the refrigerating-pipes *per se* forms, however, no part of my invention.

At the corners of the chamber I provide vertical air-tight boxes or joint-protectors D, through which the straight portions of the pipes $b$ pass, and in which the joints or elbows of the pipes are contained. The orifices where the pipes pass through the sides of the boxes D are tightly packed around the pipes with rubber or other suitable material, so that in case of leakage in the pipes within the boxes, no gases can enter the chamber A. The space around the pipes in the boxes is preferably filled with a packing of asbestus or other non-conductor of heat.

Portions of the exterior casing of the refrigerator forming the outer surfaces of the boxes D are made removable, so that access can be had from the outside to said boxes without interfering in any way with the chamber A. The portions of the pipes intervening between the boxes $f$ are preferably single pieces of pipe, so that all the joints will be in the boxes $f$. Said intervening portions of the refrigerating-pipes I inclose in practically air-tight casings B, of sheet metal or other suitable material, through which casings pass vertical air-passages $e$, extending from the lower to the upper portion of the chamber A.

The casings B are so constructed that the refrigerating-pipes and the spaces around them inclosed by said casings are entirely without communication with the chamber A and air-passages $e$. Said air-passages and casings may be variously modified in construction without departing from the spirit of my invention.

In Figs. 1 and 4 the casings B at each end of the chamber are divided into two parts separated by narrow spaces, which form the air-passages $e$, the proximate sides of the divided casings being corrugated and parallel with each other, so that the air-passages are tortuous and have a greater extent of cooling-surface than if said proximate sides were straight. In this instance there are two series of refrigerating-pipes, one in each division of the casing, and the communication of the air-passages with the upper and lower portions of the chamber is effected by making the inner division of the casing shorter than the outer division, as shown in Fig. 4, so that air can pass over the upper portion and under the lower portion of the inner division. This arrangement is preferred when a very low temperature is desired. In the construction shown in Figs. 2, 3, and 5 the air-passages are composed of vertical independent tubes set in the casings B, which are in this instance provided with but one series of refrigerating-pipes. The casing is made of less height than the chamber, and is elevated sufficiently above the bottom and terminates sufficiently far below the top of said chamber to allow the tubes or air-passages the necessary connection with the upper and lower portions of the chamber.

From the upper portions of the casings B and boxes D extend pipes $a$ $a$ to a point outside of the chamber A, for the escape of any gases which may leak from the refrigerating-pipes into said casings and boxes. Any well-known chemical refrigerant is circulated through the refrigerating-pipes in the usual manner.

It will be seen that by the employment of the boxes D, containing the joints of the refrigerating-pipes, said boxes being entirely shut off from the interior of the preserving-chamber and adapted to be entered from the outside, all gas leaking from the joints of the pipes will escape without injuring the contents of the chamber, and repairs at the joints can be effected without the admission of gas or warm air to the preserving-chamber. This feature is of especial importance in refrigerators on navigable vessels, where the strain and motion of the vessel are liable to wrench the pipes and cause leakage at the joints. The boxes, being tight, also protect the joints which they inclose from contact with the external atmosphere.

The pipes $a$, leading from the boxes D and casings B, conduct away any leaking gases and enable the leakage to be detected.

By the employment of the casings B and air-passages $e$ direct contact between the air in the chamber A and the refrigerating-pipes is avoided, thus preventing in part the formation of frost on said pipes, and cooling-surfaces—viz., the walls of the air-passages—are provided which have a greater area exposed to the air and can be more readily cleared of frost than the surfaces of the refrigerating-pipes.

The space inclosed by the casings around the refrigerating-pipes may be filled with rock-salt or other good conductor of heat, preferably solid, which will prevent the formation of any frost on the refrigerating-pipes.

The surfaces of the casings B may be coated with wood or other suitable non-conductor.

I am aware that it is not new to construct a refrigerating-chamber with a series of pipes extending beyond and outside the walls of said chamber and connected with each other by connections solely outside of said chamber; but I am not aware that the joints or connections have ever been inclosed in a tight box, which performs the two functions of preventing the gas leaking from said joints from entering the preserving-chamber and protecting said joints from the heat of the external atmosphere.

I claim—

1. In a refrigerator having one or more series of refrigerating-pipes, the boxes or joint-protectors containing the joints of said pipes, said boxes being entirely disconnected from the interior of the preserving-chamber and adapted to protect the joints of the pipes from contact with the external air, as set forth.

2. The boxes or joint-protectors containing the joints of the refrigerating-pipes and provided with pipes for the escape of leaking gas, as set forth.

3. The boxes or joint-protectors containing the joints of the refrigerating-pipes and provided with a packing of asbestus or other suitable material around said joints, as set forth.

4. In a refrigerator, the combination of a preserving-chamber, refrigerating-pipes arranged along the walls thereof, practically air-tight casings inclosing the pipes and shutting them off from contact with the air in the chamber, and air-passages passing through said casings and communicating with the upper and lower portions of the chamber, whereby direct contact between the air in the chamber and the pipes is prevented, as set forth.

5. The combination of the preserving-chamber, the double series of refrigerating-pipes, and the divided casings containing said pipes, the proximate sides of the divisions of the casings being corrugated and forming air-passages communicating with the upper and lower portions of the preserving-chamber, as set forth.

6. The casings B, inclosing the refrigerating-pipes and provided with outlets extending outside of the chamber for the escape of leaking gas, as set forth.

7. The combination of the refrigerating-pipes, the casings B surrounding said pipes, and a filling of rock-salt or other solid conductor of heat, as set forth.

In testimony whereof I have signed my name to this specification, in the presence of two subscribing witnesses, this 25th day of January, 1882.

REUBEN A. MESSERVEY.

Witnesses:
JOHN M. WATSON,
C. F. BROWN.